US008459387B2

(12) United States Patent
Field

(10) Patent No.: US 8,459,387 B2
(45) Date of Patent: Jun. 11, 2013

(54) CYCLONIC MOTOR COOLING FOR MATERIAL HANDLING VEHICLES

(75) Inventor: Michael George Field, Lansing, NY (US)

(73) Assignee: The Raymond Corporation, Greene, NY (US)

( * ) Notice: Subject to any disclaimer, the term of this patent is extended or adjusted under 35 U.S.C. 154(b) by 0 days.

(21) Appl. No.: 13/333,690

(22) Filed: Dec. 21, 2011

(65) Prior Publication Data

US 2012/0085509 A1 Apr. 12, 2012

Related U.S. Application Data

(62) Division of application No. 12/356,652, filed on Jan. 21, 2009, now Pat. No. 8,136,618.

(51) Int. Cl.
*B60K 11/00* (2006.01)

(52) U.S. Cl.
USPC .......................................... 180/68.1; 180/68.3

(58) Field of Classification Search
USPC 180/68.1, 68.3; 165/41; 137/565.01; 310/54; 237/28
See application file for complete search history.

(56) References Cited

U.S. PATENT DOCUMENTS

| | | | | | |
|---|---|---|---|---|---|
| 636,887 | A | * | 11/1899 | Bell | 62/310 |
| 2,209,078 | A | * | 7/1940 | Gettinger | 123/41.68 |
| 2,741,105 | A | * | 4/1956 | Stratton | 62/314 |
| 3,195,626 | A | * | 7/1965 | Druseikis et al. | 165/179 |
| 3,437,855 | A | * | 4/1969 | Laing | 310/62 |
| 3,732,802 | A | * | 5/1973 | Kristof | 126/299 D |
| 3,790,309 | A | * | 2/1974 | Volz | 417/368 |
| 3,822,565 | A | * | 7/1974 | Arzberger | 62/392 |
| 4,087,707 | A | * | 5/1978 | Shinoda et al. | 310/63 |
| 4,162,905 | A | * | 7/1979 | Schuler | 55/337 |
| 4,199,332 | A | * | 4/1980 | Krohn et al. | 96/208 |
| 4,300,720 | A | * | 11/1981 | Baier et al. | 237/12.3 A |
| 4,339,014 | A | * | 7/1982 | Berth et al. | 180/68.1 |
| 4,853,162 | A | | 8/1989 | Liu | |
| 4,995,349 | A | * | 2/1991 | Tuckey | 123/65 VB |
| 5,209,069 | A | * | 5/1993 | Newnan | 62/3.64 |
| 5,250,863 | A | * | 10/1993 | Brandt | 310/54 |
| 5,285,863 | A | * | 2/1994 | Miki | 180/68.2 |
| 5,588,353 | A | * | 12/1996 | Glucksman et al. | 99/348 |
| 5,616,973 | A | * | 4/1997 | Khazanov et al. | 310/54 |
| 5,643,470 | A | * | 7/1997 | Amini | 210/787 |
| 5,706,671 | A | * | 1/1998 | Lee et al. | 62/407 |
| 5,731,674 | A | * | 3/1998 | Jeske | 318/400.08 |
| 5,756,962 | A | * | 5/1998 | James et al. | 219/121.75 |
| 5,878,990 | A | * | 3/1999 | Delire | 248/604 |
| 6,011,331 | A | * | 1/2000 | Gierer et al. | 310/58 |

(Continued)

FOREIGN PATENT DOCUMENTS

WO 2004008052 A2 1/2004

*Primary Examiner* — John R Olszewski
*Assistant Examiner* — Brodie Follman
(74) *Attorney, Agent, or Firm* — Quarles & Brady LLP

(57) ABSTRACT

A material handling vehicle includes a cyclonic motor cooling system for a motor compartment that accommodates an ergonomically designed operator compartment. Together, the motor compartment and cyclonic motor cooling system include a generally cylindrical housing with a tangentially arranged cooling air injection port at a lower end and exhaust port at a radially and axially opposite end. An air blower directs cooling air into the compartment where a cyclonic cooling air flow and a vortex cooling flow is produced. The cyclonic air flow cools more effectively than conventional linear air flow while also reducing dust contamination and buildup of the motors in the motor compartment.

18 Claims, 6 Drawing Sheets

U.S. PATENT DOCUMENTS

| | | | | |
|---|---|---|---|---|
| 6,871,721 | B2 * | 3/2005 | Smiley et al. | 180/333 |
| 7,249,931 | B2 * | 7/2007 | Parker et al. | 415/221 |
| 7,448,212 | B2 * | 11/2008 | Wood | 60/605.2 |
| 7,618,233 | B2 * | 11/2009 | Parker et al. | 415/119 |
| 8,136,618 | B2 * | 3/2012 | Field | 180/68.1 |
| 2003/0168267 | A1 | 9/2003 | Borroni-Bird et al. | |
| 2004/0150270 | A1 * | 8/2004 | Nagayama et al. | 310/61 |
| 2004/0165986 | A1 * | 8/2004 | Parker et al. | 415/220 |
| 2006/0156504 | A1 * | 7/2006 | Bruneau | 15/314 |
| 2006/0196954 | A1 * | 9/2006 | Okuda et al. | 236/49.3 |
| 2007/0219670 | A1 * | 9/2007 | Tanaka et al. | 700/295 |
| 2008/0030086 | A1 * | 2/2008 | Noda et al. | 310/57 |
| 2008/0060860 | A1 * | 3/2008 | Murase et al. | 180/65.3 |
| 2008/0101906 | A1 * | 5/2008 | Gotz et al. | 414/544 |
| 2008/0115989 | A1 * | 5/2008 | Matte et al. | 180/68.1 |
| 2008/0202857 | A1 * | 8/2008 | Waltz et al. | 187/233 |
| 2009/0095462 | A1 * | 4/2009 | Ramaswamy | 165/288 |
| 2009/0139473 | A1 | 6/2009 | McMillan | |
| 2009/0145514 | A1 | 6/2009 | Sisk | |
| 2009/0173471 | A1 * | 7/2009 | Sakamoto | 165/41 |
| 2009/0197154 | A1 * | 8/2009 | Takasaki et al. | 429/83 |
| 2009/0207880 | A1 * | 8/2009 | Ahladas et al. | 374/141 |
| 2009/0218981 | A1 * | 9/2009 | Heckenbach | 318/799 |
| 2010/0162685 | A1 * | 7/2010 | Hirshberg | 60/266 |
| 2010/0181128 | A1 * | 7/2010 | Field | 180/68.1 |
| 2010/0203820 | A1 * | 8/2010 | Marsh et al. | 454/237 |
| 2012/0085509 | A1 * | 4/2012 | Field | 165/41 |

* cited by examiner

CYCLONIC MOTOR COOLING FOR MATERIAL HANDLING VEHICLES

CROSS-REFERENCE TO RELATED APPLICATIONS

This application is a divisional of U.S. patent application Ser. No. 12/356,652 filed on Jan. 21, 2009 now U.S. Pat. No. 8,136,618.

STATEMENT REGARDING FEDERALLY SPONSORED RESEARCH

Not applicable.

BACKGROUND OF THE INVENTION

The present invention relates to material handling vehicles, interchangeably referred to herein as "lift trucks", and more particularly, to a cyclonic motor cooling system for use in motor compartments of material handling vehicles.

Lift trucks are designed for use in various types of environments and applications. Lift trucks are configured to perform functions necessary in a given environment of use or application. Lift truck operator compartments are, in turn, designed to allow the operators to assume an operating position allowing them to perform the required material handling task.

To this end, some lift trucks operator compartments have been designed so that an operator has the option of operating the lift truck in either a standing or a seated position. Operator compartments for these types of lift trucks (e.g., a 'sit/stand' truck) have been modified to include, among other things, a foldable seat and an elevated footrest. Adding such a footrest, however, is difficult due to the design limitations of crowded operator compartments. One known modification for adding an elevated footrest to an operator compartment is to decrease the size of the adjacent motor compartment. This, however, comes at a cost, namely, reduced motor cooling capacity as explained below.

Standard motor compartments typically house two, and sometimes three, motors: one for propelling the forklift truck (i.e., a traction motor), one for steering (i.e., a steering motor) and one for driving a hydraulic pump to lift the fork carriage (i.e., a lift motor). These motors usually have an attached cooling fan that provides adequate cooling if housed in a standard motor compartment. When housed in a smaller motor compartment, however, the temperature therein rises at much faster rate and quickly overwhelms the capacity of the cooling fans to effectively cool the motors and other heat-generating components located therein.

To protect the motors from high temperatures, some lift trucks were outfitted with a thermal switch whereby the entire lift truck is shut down if the motor temperature is high. Other lift trucks are provided with advanced control schemes that reduce the speed and/or acceleration of overheated motors to cool them. However, both of these schemes require additional logic and circuitry and do not act to dissipate the heat once generated.

Most lift trucks are therefore provided with some sort of ventilated motor compartment. The most basic of which is a compartment with one or more openings therein to allow for the circulation of ambient air. If the motor compartment or openings are large enough, or if there is only a minimal amount of heat generated, the limited cooling capacity of such openings may suffice. However, forklifts are typically operated indoors at low speeds (and even standing still) and as a result, only minimal ventilation (and thus cooling) occurs.

Some lift trucks are provided with motor compartments having a forced-air cooling system. In such a system, hopefully cooler ambient air is directed through the motor compartment to remove an amount of heated air therefrom for conventional heat dissipation away from the compartment. In such a system, however, the forced cooling air has a generally linear air flow profile as it passes through the motor compartment. The linear flowing cooling air is impeded by the motors, reducing the amount of air flowing through the compartment and transferring heat from the motors therein. Utilizing a larger blower merely results in the greater introduction of dust and debris into the motor compartment which then accumulates on the motors and decreases the heat removal effectiveness of the forced cooling air.

To this end, FIGS. 1 and 2 illustrate an operator compartment 10 for a material handling vehicle 12 having a forced air motor cooling system 40. The operator compartment 10 is defined by an operator station 14 with an opening 16 for entering and exiting the compartment 10. Operator controls includes a steering wheel 18 and a control handle 20. The operator compartment 10 further includes a seat 24 adjacent to the control handle 20 and an elevated footrest 25 for use when the lift truck 12 is operated from a seated position. The seat 24 can be folded flat to provide additional space in the operator compartment 10 when the lift truck 12 is operated from a standing position. First and second deadman switches 21, 22 are provided in the floor 23 and footrest 25 of the operator compartment 10. As is known, one of the deadman switches 21, 22 must be actuated in order to operate the vehicle 12.

Adjacent to the operator compartment 10 are two motor compartments 26, 28. The first motor compartment 26 has two electric motors therein—a larger traction motor 30 and a smaller steering motor 32. The second motor compartment 28 houses the lift motor (not shown) and associated hydraulic circuit for lifting the fork carriage up and down and is not discussed in further detail herein. A more detailed discussion on the various components of a similar, side stance, lift truck can be found in U.S. Pat. No. 6,871,721 assigned to the present assignee, the contents of which are fully incorporated herein by reference.

The traction motor 30 is mounted to a gear box (not shown) and propels the truck 12 at a directed speed. The steering motor 32 controls the direction of travel of the lift truck 12. Both motors 30, 32, along with other electrical control components contained in the motor compartment 26 not shown, generate an appreciable amount of heat.

The motor compartment 26 is defined on the bottom by a lift truck chassis 34, on the sides by walls 36, and on to by a cover 38. A number of openings, e.g. air intake port 42 and exhaust port 44, are formed in the walls 36 of the motor compartment 26. The air intake port 42 directs cooling air from a fan or blower 46 into the compartment 26. The cooling air flows in a generally linear path, as shown by arrows 48, through the motor compartment 26, removes heat from the motors 30, 32 via convection, and is subsequently discharged through the exhaust port 44.

While the conventional forced air system 40 is an improvement over the cooling provided by ambient air ventilation, the linear flow profile of the cooling air limits the cooling capacity especially in point-to-point applications such as in the motor compartment 26. This is because the motors 30, 32, being located directly in the path of the cooling air for the greatest heat transfer, act to impede the cooling air and shield the back surfaces of the motors 30, 32 from the cooling air.

The linear flow profile also contributes to the accumulation of thermally insulating dust and debris on the motors 30, 32 further limiting the heat removing capacity of the forced air system 40. A larger blower may help increase the air flow through the compartment 26, but this results in increased manufacturing and operating costs of the lift truck 12. Further, a larger blower would introduce even more dust and debris into the compartment 26 perhaps negating the effect of the larger blower.

Accordingly, a need exists for a motor cooling system that effectively and efficiently cools motors located in small enclosed spaces, such as found in a material handling vehicle with an ergonomically designed operator compartment. The present invention addresses these issues.

SUMMARY OF THE INVENTION

One aspect of the present invention provides a method of operating a material handling vehicle having an operator compartment and a motor compartment with at least one heat generating component inside, the method comprising the steps of directing cooling air into through the motor compartment in a generally helical manner to create a cyclonic air flow, resulting in a vortex effect, to efficiently cool the heat generating components when the vehicle is enabled for operation.

This and other aspects of the present invention will be apparent from the following description. In the Detailed Description section, preferred embodiments of the invention will be described in reference to the accompanying drawing figures. These embodiments do not represent the full scope of the invention. Rather the invention may be employed in other embodiments. Reference should therefore be made to the Claims section for interpreting the breadth of the invention.

DETAILED DESCRIPTION OF THE PREFERRED EMBODIMENTS

Figure 1:
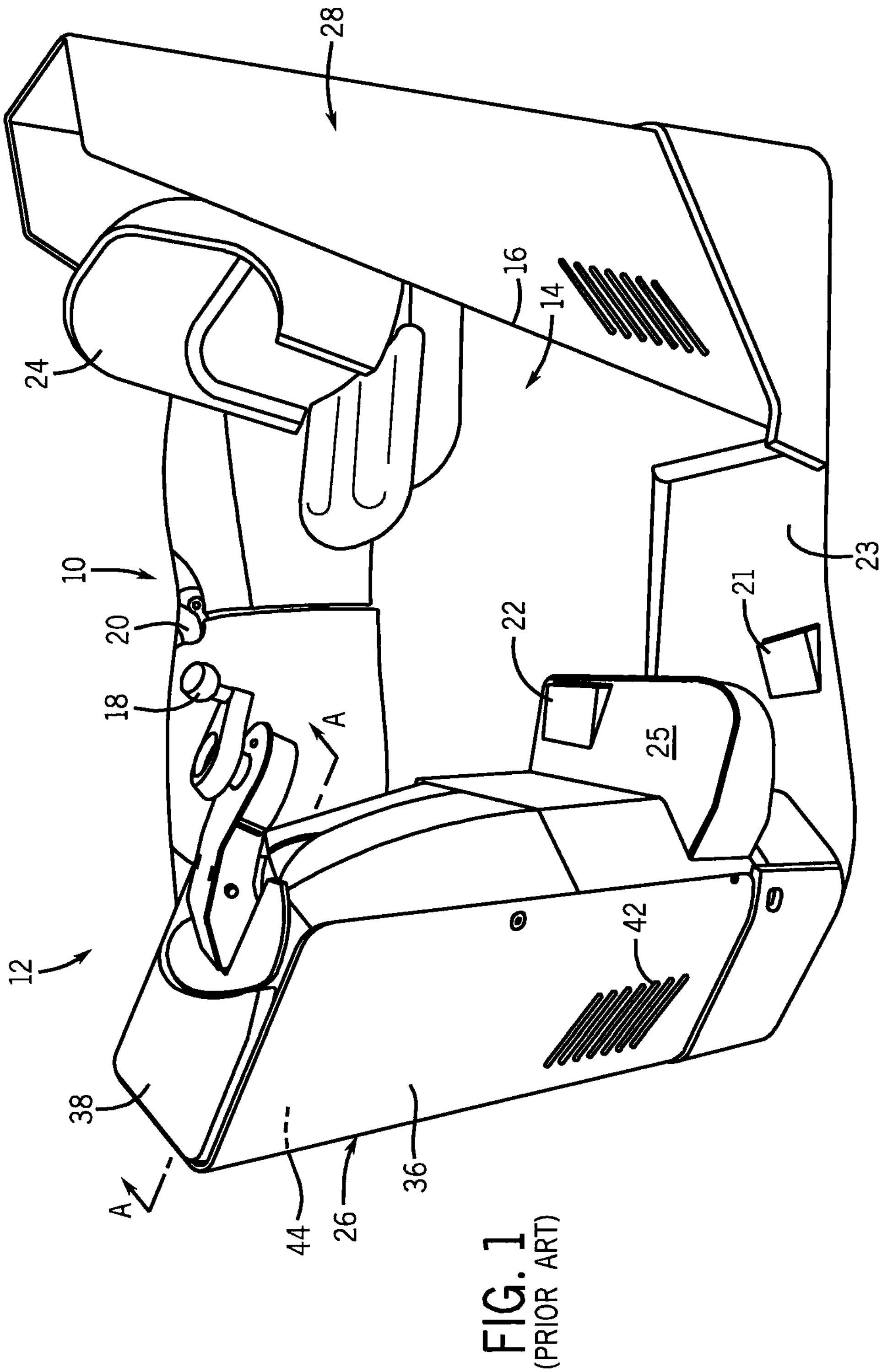
FIG. 1 (PRIOR ART)
FIG. 1, already described, is a perspective view of an operator compartment and motor compartment with a conventional motor cooling system for a material handling vehicle.
Figure 2:
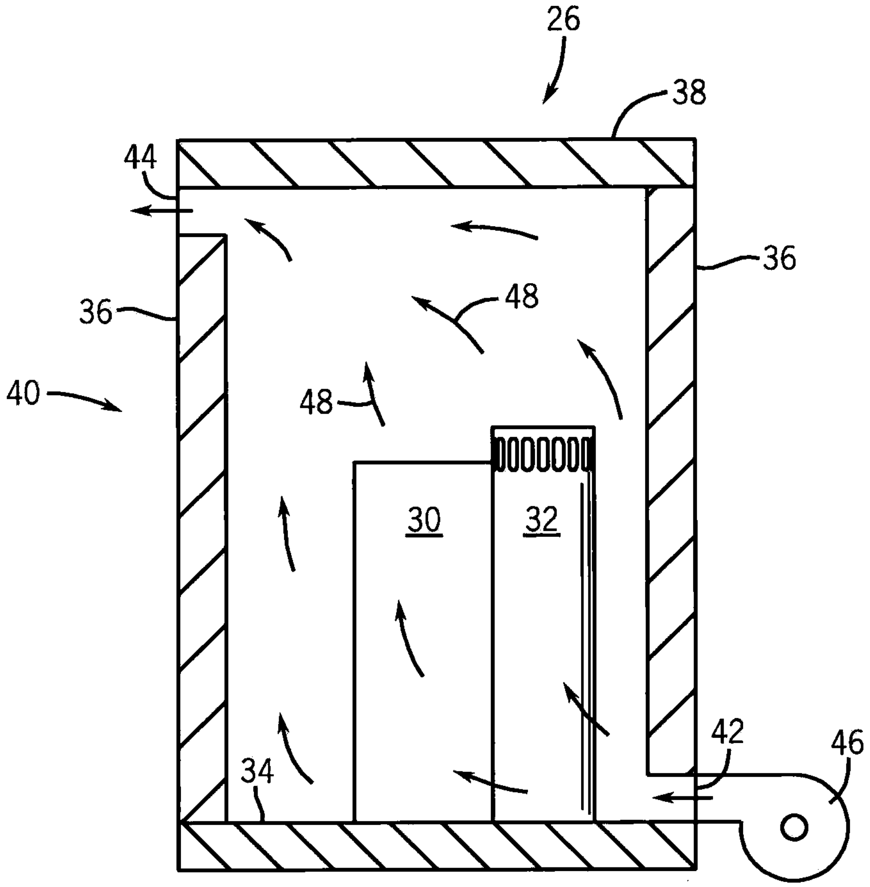
FIG. 2 (PRIOR ART)
FIG. 2, already described, is a cross sectional side view of the motor compartment of FIG. 1 taken along line A-A showing a point-to-point forced air cooling system.
Figure 3:
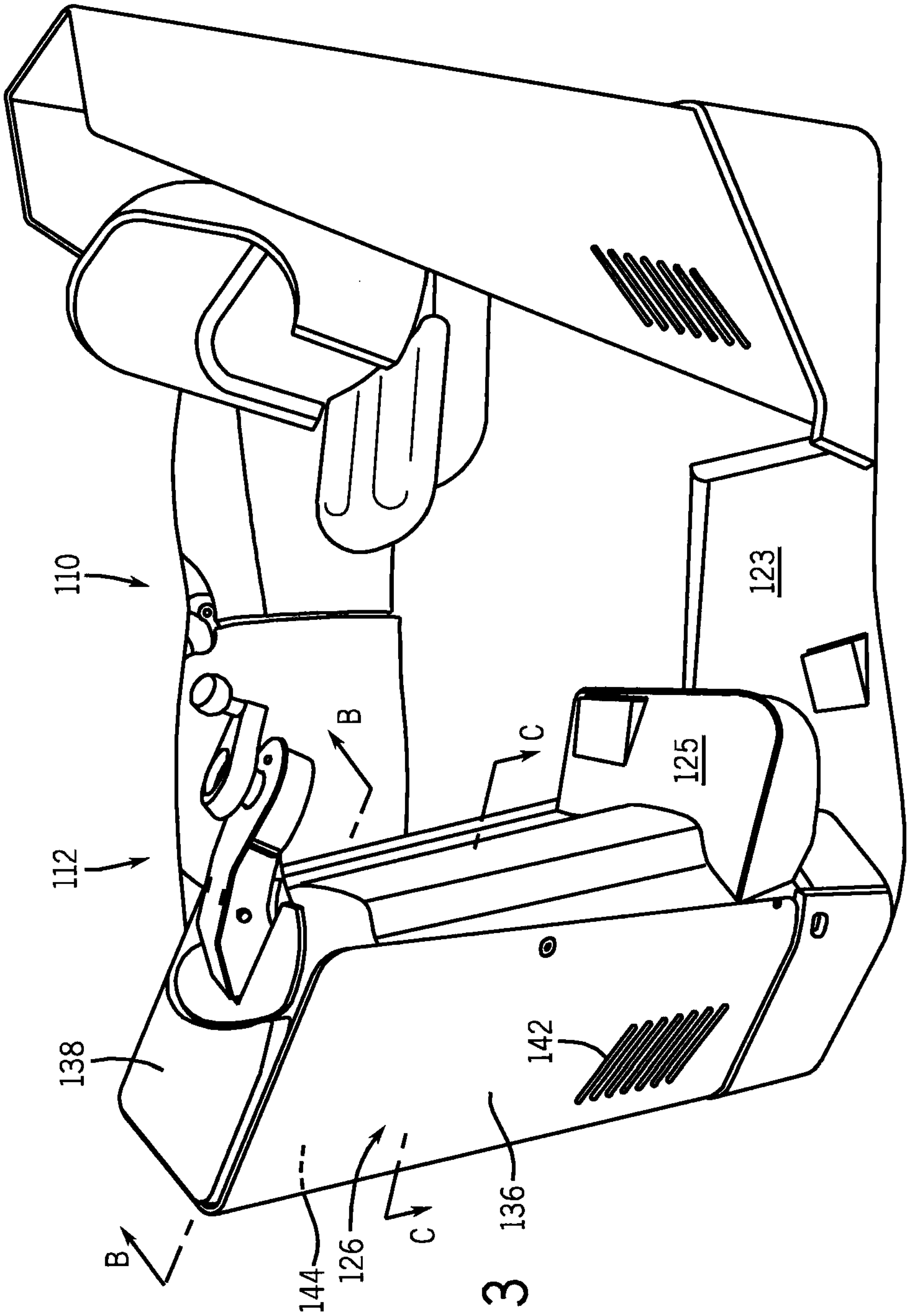
FIG. 3 is a perspective view of an operator compartment and motor compartment with a cyclonic motor cooling system for a material handling vehicle.
Figure 4:
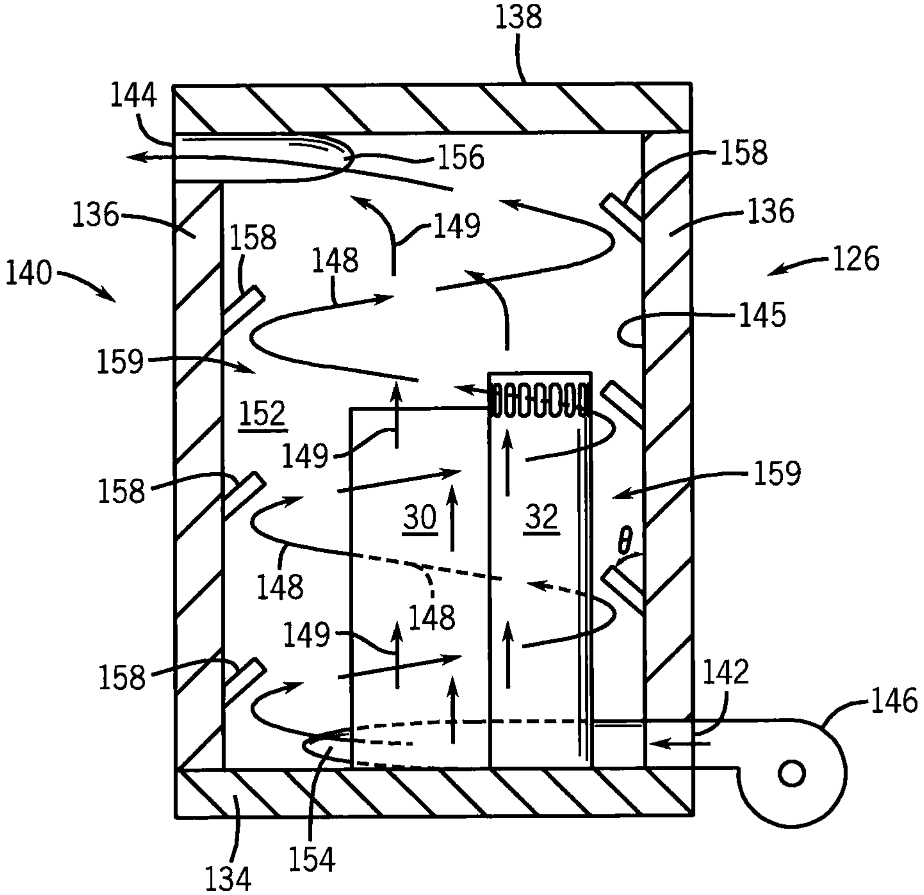
FIG. 4 is a cross sectional side view of the motor compartment of FIG. 3 taken along line B-B illustrating a first embodiment of a cyclonic motor cooling system constructed in accordance with the present invention.
Figure 5:
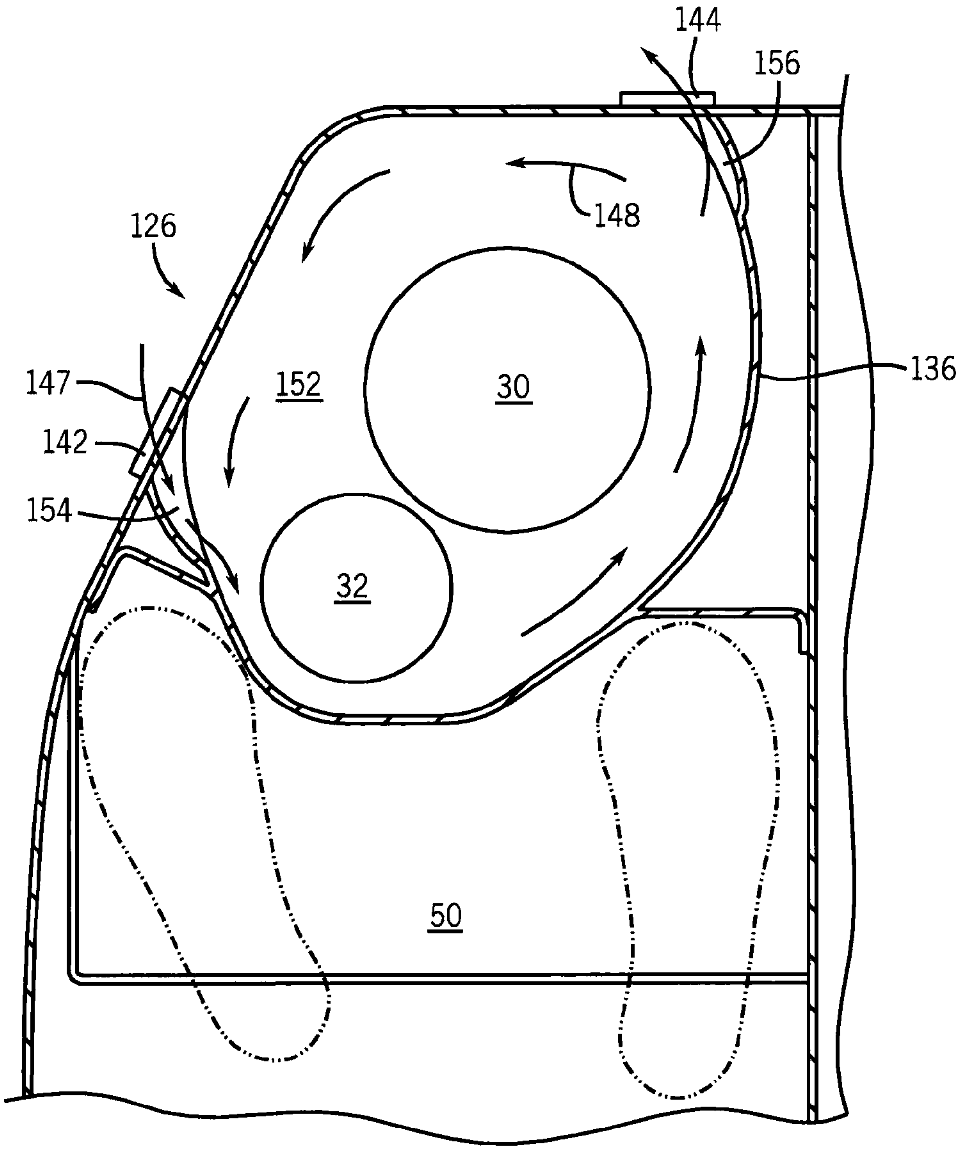
FIG. 5 is a cross sectional top view of the motor compartment of FIG. 3 taken along line C-C.

Referring generally to FIGS. 3-5 a material handling vehicle 12 constructed in accordance with the present invention includes an operator compartment 10 and a motor compartment 126 provided with a cyclonic motor cooling system 140. The motor compartment 126 is defined on the bottom by a lift truck chassis 134, on the sides by a generally cylindrical wall 136, and on the top by a cover 138. An air injection port 142 coupled to a blower 146 is disposed low in the wall 136 of the motor compartment 126 and an exhaust port 144 is disposed high in the wall 136 and generally radially disposed from the injection port 142. A generally annular enclosed space 152 of the motor compartment 126 is defined by an inner surface 145 of the cylindrical wall 136 and the outer surfaces of the motors 30, 32.

The cyclonic motor cooling system 140 cools the motors 30, 32 more efficiently than the conventional forced air motor cooling system 40 by, among other things, providing a cyclonic, i.e., having a helical profile, cooling air flow within the air space 152 of the motor compartment 126. Cooling air flowing in a helical path, indicated by arrows 148, cools the motors 30, 32 more efficiently than the conventional cooling system 40 for a number of reasons. One such reason is that the increased cooling air velocity and motor surface contact provided by the helical profile allows for more convective cooling of the motors 30, 32. A further reason is that the cyclonic cooling air flow, causes a vortex effect within the compartment 126, and thus allows for convective cooling of motor surfaces shielded from linear cooling air flow. Still further, the increased velocity and centripetal forces of the cyclonic cooling air keep thermally insulating dust and debris away from the motors 30, 32, thus maximizing the convective cooling effect of the cyclonic cooling air.

Figure 6:
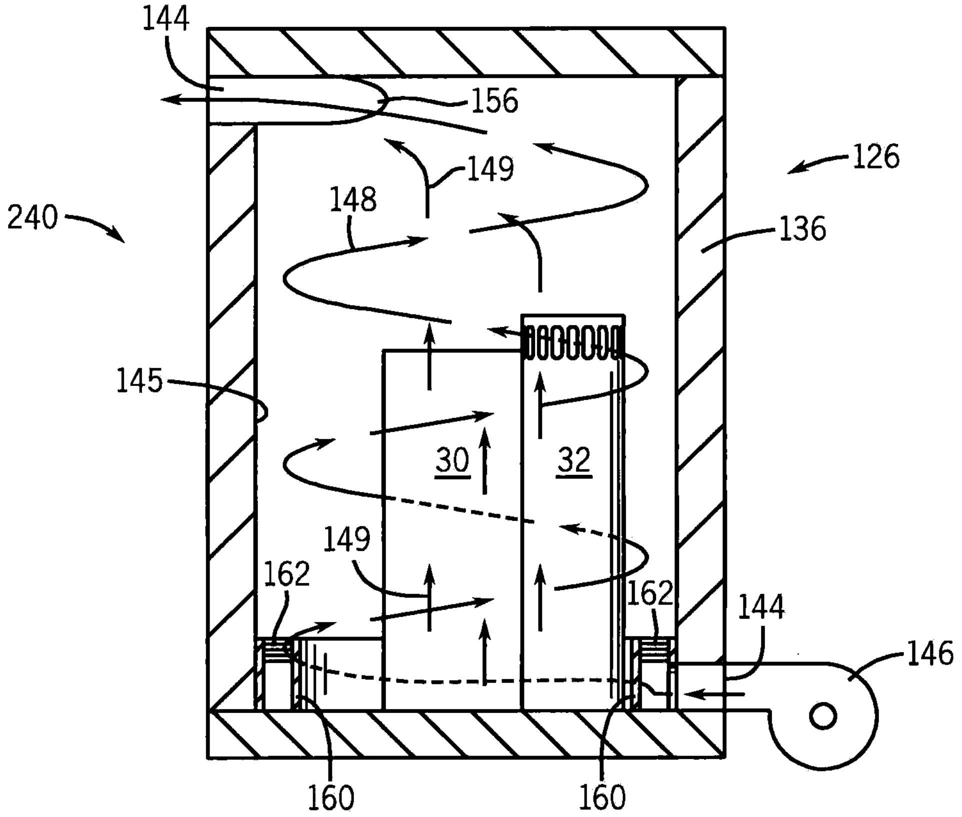
FIG. 6 is a cross sectional side view of the motor compartment of FIG. 3 taken along line B-B illustrating a second embodiment of a cyclonic motor cooling system constructed in accordance with the present invention.

With reference to the common operation of both cyclonic motor cooling systems 140, 240 illustrated in FIGS. 4 and 6, respectively, the motor compartment 126 receives a stream of cooling air from the blower 146 substantially tangential with the cylindrical wall 136 via the air injection port 142. The cooling air is redirected from a linear tangential flow, represented by an arrow 147, into a laminar cyclonic flow (i.e., following the helical path 148) via, e.g., a scoop-shaped channel 154 and helical air aligners 158 (FIG. 4) or a baffle cylinder 160 with vanes 162 (FIG. 6).

The cyclonic cooling air travels upwardly through the annular space 152 following the generally helical-shaped path 148 around the motors 30, 32. Because of the helical flow profile, 148, the cyclonic cooling air has greater axial and circumferential contact with the motor surfaces, minimizing the motor surface areas shielded from the cooling air. The cyclonic cooling air causes a vortex effect within the compartment 152, resulting in an additional, linear cooing air flow following a vertical path, represented by arrows 149, about the central axis of the compartment 152. The additional cooling air flow 149 created by the vortex effect transfers heat away from portions of the motors 30, 32 shielded from the cyclonic cooling air. Heated cooling air is discharged into the surrounding environment through the exhaust port 144, having a similar scoop-shaped channel 156 formed in the wall 136.

Dust and debris carried into the motor compartment 126 by the cooling air flow or already present in the compartment 126 is directed away from the motors 30, 32 by the centripetal force of the cyclonic cooling air and carried out of the exhaust port 144 due to the velocity of the cooling air. Thus, the insulating dust and debris does not accumulate on the motors 30, 32, permitting still greater convective cooling of the motors 30, 32 by the cooling air, as well as improving motor cleanliness and bearing life. In applications where less cooling air is needed due to the increased cooling efficiency of the cyclonic motor cooling system 140, a further benefit is that less dust and debris is introduced into the compartment 126 than with a similar-sized conventional cooling system 40.

With specific reference to FIGS. 3-5, a first embodiment of the cyclonic motor cooling system 140 is shown. A number of helical air aligners 158, or alternatively, a continuous helical baffle 158, extend axially upwardly throughout the compartment 126. The helical air aligners 158 extend radially inwardly from the inner surface 145 of the wall 136, at an acute angle Θ, to form spiral cooling air channels 159 therebetween. The spiral channels 159 direct the cooling air vertically towards the exhaust port 144 and help maintain the helical flow path 148 of the cyclonic cooling air.

A variety of factors are taken into consideration in designing the appropriate air aligner 158/cooling channel 159 arrangement to ensure that the cyclonic cooling system 140 has the capacity to adequately cool the motor compartment 126. Environmental factors affecting the cooling capacity include the size of the motor compartment 126, amount of heat generated by the motors 30, 32, and the temperature of lift truck operating environment. Structural factors affecting the cooling capacity include the radial width of the air aligners 158, the axial width of the channels 159 formed by the air aligners 158, and the vertical distribution of the air aligners 158 between the air injection port 142 and the exhaust port 144.

With specific reference to FIG. 6 now, a second embodiment of the cyclonic motor cooling system 240 is shown. The cyclonic cooling system 240 includes an upwardly extending baffle cylinder 160 circumferentially disposed about the inner surface 145 of the motor compartment 126. The baffle cylinder 160 receives the linearly or tangentially directed cooling air from the air injection port 144 and redirects the cooling air circumferentially. The cooling air is deflected axially upwardly as it travels circumferentially through the cylinder 160. The cooling air is given a helical swirling motion as it flows past a number of inclined deflector vanes 162 arranged at the upper end of the baffle cylinder 160.

Thus, the cyclonic motor cooling systems 140, 240 provide more effective heat removal from motor compartments 126, reducing the need for larger blowers or other types of cooling system, e.g., liquid cooling, for smaller motor compartments 126. Those of ordinary skill in the art will understand that the efficacy of the cooling air will depend on a variety of design factors, including, but not limited to the velocity of the cooling air, the shape and volume of the compartment 126, the orientation and size of the injection and exhaust ports 142, 144, and the like.

The two exemplary cyclonic cooling systems 140, 240 are illustrated as open loop systems wherein the cooling air is drawn in directly from the surrounding environment and discharged directly back to the surrounding environment. Alternatively, a closed loop system having a heat exchanger (not shown) coupled to the injection port 142 to supply cooled air thereto and to the exhaust port 144 to receive heated air therefrom may be utilized.

Temperature or current sensors may be utilized in connection with the motors 30, 32 to control the blower 146, and thus the vortex-induced forced convection of the cooling air, as a function of motor temperature or current draw. For example, the blower 146 may be turned on only when the motor 30, 32 temperature is too high, or the current drawn correlates to a large amount of generated heat. Alternatively, a variable speed drive may be provided so as to minimize the total power required under light loads and to increase torque output under heavy loads by being able to momentarily run the motors 30, 32 harder without the risk of overheating.

Although the material handling vehicle 12 as shown by way of example is a standing or sitting, side stance operator configuration lift truck, it will be apparent to those of skill in the art that the present invention is not limited to vehicles of this type, and can also be provided in various other types of material handling and lift truck configurations.

While there has been shown and described what are at present considered the preferred embodiments of the invention, it will be obvious to those skilled in the art that other changes and modifications can be made therein without departing from the scope of the invention as defined by the appended claims.

I claim:

1. A method of operating a material handling vehicle, said vehicle including a motor compartment with at least one heat generating component inside the motor compartment, said method comprising:

directing a generally helical air flow through the motor compartment, wherein the air flow creates a vortex effect to cool the heat generating components.

2. The method of claim 1, in which the motor compartment includes a generally cylindrical housing surrounding the at least one heat generating component, and directing the generally helical air flow through the motor compartment includes introducing cooling air into the generally cylindrical housing; directing the cooling air through the generally cylindrical compartment in a generally helical manner; and removing the generally helical cooling air from the generally cylindrical compartment.

3. The method of claim 2, in which the generally cylindrical housing includes an air inlet and an air outlet, and directing the generally helical air flow through the motor compartment includes introducing the cooling air into the generally cylindrical housing through the air inlet, and removing the cooling air from the generally cylindrical housing through the air outlet.

4. The method of claim 1, in which at least one helical air aligners disposed inside the motor compartment guides cooling air in a generally helical direction to form the generally helical air flow through the motor compartment.

5. The method of claim 1, in which directing the generally helical air flow through the motor compartment includes forcing a generally helical flow of cooling air through the motor compartment.

6. The method of claim 1, in which a fan forces the generically helical flow of cooling air through the motor compartment.

7. The method of claim 6, in which said at least one heat generating component inside the motor compartment is a motor and the fan is a variable speed fan controlled as a function of at least one of temperature of the motor and current draw of the motor.

8. A method of operating a material handling vehicle, said method comprising: a heat generating component generating heat inside a motor compartment of the material handling vehicle; forcing a generally helical air flow through the motor compartment such that a vortex effect is created to cool components disposed in the motor compartment.

9. The method of claim 1, in which the motor compartment includes a generally cylindrical housing surrounding at least one heat generating component, and directing the generally helical air flow through the motor compartment includes introducing cooling air into the generally cylindrical housing; directing the cooling air through the generally cylindrical compartment in a generally helical manner; and removing the generally helical cooling air from the generally cylindrical compartment.

10. The method of claim 9, in which the generally cylindrical housing includes an air inlet and an air outlet, and directing the generally helical air flow through the motor compartment includes introducing the cooling air into the generally cylindrical housing through the air inlet, and removing the cooling air from the generally cylindrical housing through the air outlet.

11. The method of claim 8, in which at least one helical air aligner guides cooling air in a generally helical direction to form the generally helical air flow through the motor compartment.

12. The method of claim 8, in which a fan forces the generically helical air flow through the motor compartment.

13. The method of claim 12, in which said heat inside the motor compartment is generated by a motor inside the motor compartment, and the fan is a variable speed fan controlled as a function of at least one of temperature of the motor and current draw of the motor.

14. A method of operating a material handling vehicle, said vehicle including a motor compartment with at least one heat generating component inside the motor compartment, said method comprising:

introducing cooling air into the motor compartment;

directing the cooling air in a generally helical manner in the motor compartment and around the at least one heat generating component, wherein the cooling air creates a vortex effect in the motor compartment to cool the at least one heat generating component; and removing the cooling air from the motor compartment.

15. The method of claim 14, in which the motor compartment includes an air inlet and an air outlet, and the cooling air is introduced into the motor compartment through the air inlet, and the cooling air is removed from the motor compartment through the air outlet.

16. The method of claim 14, in which at least one helical air aligner directs the cooling air in a generally helical manner in the motor compartment.

17. The method of claim 14, in which a fan introduces the cooling air into the motor compartment.

18. The method of claim 17, in which said at least one heat generating component inside the motor compartment is a motor and the fan is a variable speed fan controlled as a function of at least one of temperature of the motor and current draw of the motor.

* * * * *